United States Patent [19]

Chamberlin

[11] Patent Number: 5,417,512
[45] Date of Patent: May 23, 1995

[54] END CONNECTOR WITH CAPTIVE BALL AND BEARING HALF WITH CRUSHED ELEMENTS

[75] Inventor: James B. Chamberlin, Charlotte, N.C.

[73] Assignee: AVM, Inc., Marion, S.C.

[21] Appl. No.: 147,721

[22] Filed: Nov. 4, 1993

[51] Int. Cl.⁶ .................... F16G 11/00; F16B 17/00
[52] U.S. Cl. .................... 403/135; 403/122; 403/119; 403/282; 403/281; 403/274; 29/898.043
[58] Field of Search .......... 403/135, 136, 131, 122, 403/119, 351, 366, 365, 372, 282, 279, 275, 274, 276, 281; 384/626; 188/201; 411/9–11, 314, 313, 137, 150; 29/898.043, 898.044, 453, 515, 520

[56] References Cited

U.S. PATENT DOCUMENTS

| | | | |
|---|---|---|---|
| 1,098,974 | 6/1914 | Reilly | 29/520 |
| 2,010,367 | 8/1935 | Lapsley . | |
| 2,010,569 | 8/1935 | Sitzler | 29/520 |
| 3,337,246 | 8/1967 | Moskovitz | 403/135 |
| 3,405,597 | 10/1968 | Elsner et al. . | |
| 4,720,205 | 1/1988 | Ito | 403/135 |

Primary Examiner—Randolph A. Reese
Assistant Examiner—Anthony Knight
Attorney, Agent, or Firm—McAndrews, Held & Malloy, Ltd.

[57] ABSTRACT

A captive ball and end connector assembly having an annular bearing half positioned within the cavity is disclosed. The bearing half has an inner spherical surface on which are disposed a plurality of crush elements or ribs, and a bottom planar surface on which is disposed an annular crush element or rib. The plurality of crush elements crush against the spherical surface of the captive ball, and the annular crush element crushes against an annular shoulder in the cavity to retain the ball within the cavity with a zero clearance. A ball retaining ring is disposed within a groove in the cavity and bears against the bearing half to hold the ball firmly in the cavity.

19 Claims, 2 Drawing Sheets

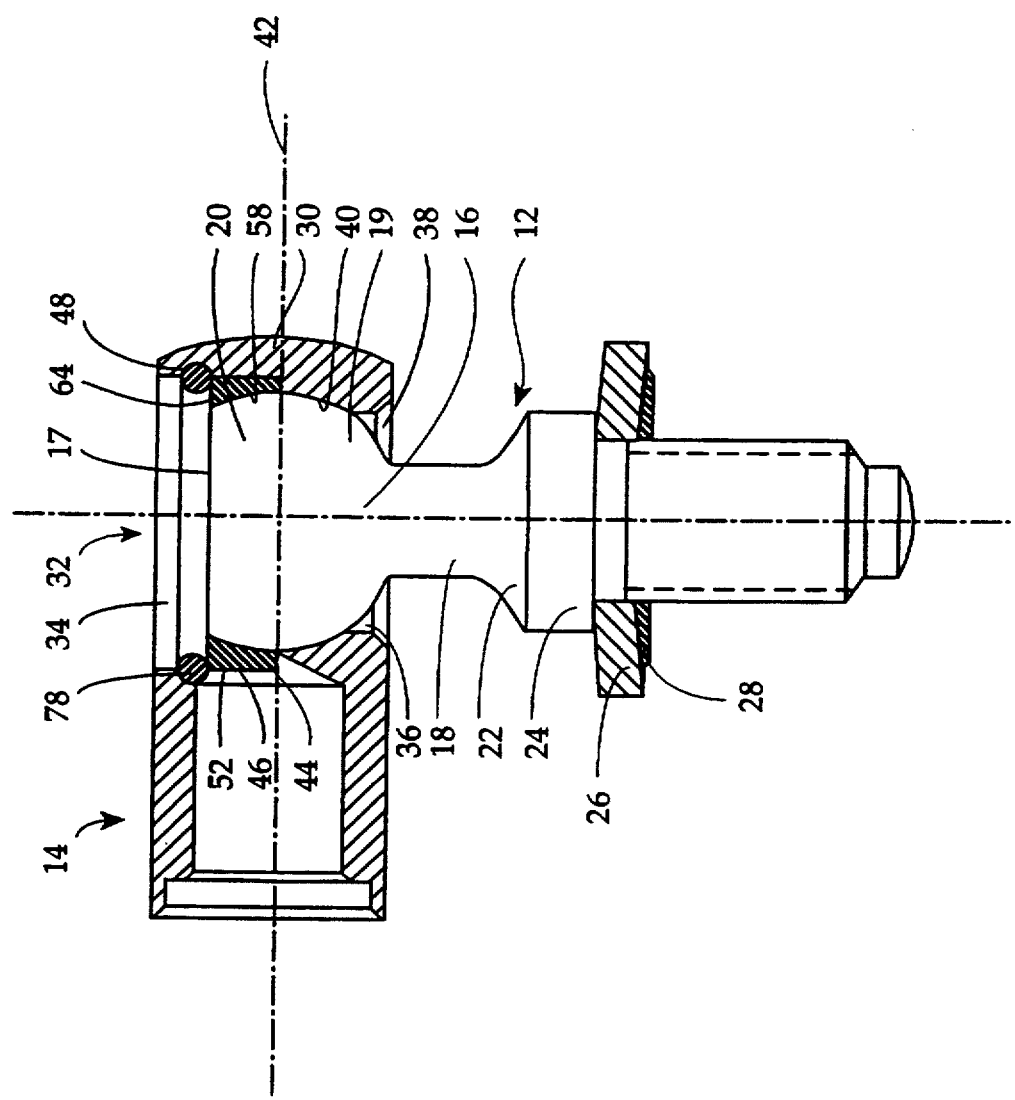

END CONNECTOR WITH CAPTIVE BALL AND BEARING HALF WITH CRUSHED ELEMENTS

BACKGROUND OF THE INVENTION

The present invention relates to captive ball and end connector assemblies and, in particular, to captive ball and stud end connector assemblies having a half bearing within the socket to provide a ball to socket fit with essentially zero clearance.

Captive ball and end connector assemblies are well-known in the art. Such assemblies—comprising a shaft with a ball at one end and an end connector with a socket for receiving the ball—have been used for years to mechanically interconnect relatively moveable parts.

Previously those working in the art have been seeking a relatively inexpensive captive ball and end connector assembly that provides a ball to socket fit with essentially zero clearance. A zero clearance is desirable since it insures that the parts will not rattle or become noisy. Noise free captive ball and end connector assemblies are especially desirable for automobile applications where vibration is more or less always present.

Previous captive ball and end connector assemblies, such as the captive ball and socket assembly disclosed in Lapsley, U.S. Pat. No. 2,010,367, relied upon a complex socket groove configuration with a wire ring retainer riding biased against an internal ramp surface of the groove, and against the spherical surface of the ball, to provide a zero clearance assembly. The complex socket groove configuration, however, is relatively expensive to produce, thus increasing the cost of the captive ball and end connector assemblies.

SUMMARY OF THE INVENTION

Accordingly, it is an object of the present invention to provide a captive ball and end connector assembly that can be manufactured, at a competitive cost, to provide a ball to socket fit with essentially zero clearance.

A related object of the present invention is to provide a captive ball and end connector assembly that does not rely on a complex socket groove configuration to achieve a zero clearance between the captive ball and socket.

Another object of the invention is to provide a noise free captive ball and end connector assembly that is well suited for automotive applications.

A further object of the present invention is to provide a captive ball and end connector assembly comprising a shaft having a first end and a longitudinal axis; a ball on the first end of the shaft, with the ball having an outer, substantially spherical surface with a first hemispherical portion and a second hemispherical portion. An end connector has a ball receiving cavity and a first opening in communication with the cavity, with the first opening having a diameter larger than that of the ball so that the ball may be inserted into the cavity. The cavity includes an annular groove disposed adjacent the first opening, and a spherical zone surface formed to correspond to the first hemispherical portion of the ball. The spherical zone surface terminates in an annular shoulder recessed from the spherical zone surface. An annular bearing half has a circumferential planar surface at one end thereof and an inner spherical surface formed to correspond to the second hemispherical portion of the ball. The planar surface has an annular crush element projecting axially therefrom, and the inner spherical surface has a plurality of crush elements projecting radially inwardly therefrom. The bearing half is positioned within the cavity so that the annular crush element bears against the annular shoulder and the plurality of crush elements bear against the second hemispherical portion of the ball to retain the ball within the cavity with a zero clearance therebetween. A ball retaining ring is disposed within the cavity groove and bears against the bearing half to prevent the ball from being pulled out of the cavity.

These and other objects and advantages of the present invention will become apparent from the following description of the preferred embodiment of the invention as illustrated by the accompanying drawings next described.

DESCRIPTION OF THE DRAWINGS

FIG. 1 is a vertical cross-sectional view of the assembly of the present invention showing the captive ball mounted in the cavity, with the bearing half and the retaining ring in their retaining positions;

DETAILED DESCRIPTION OF THE PREFERRED EMBODIMENTS

Figure 4:
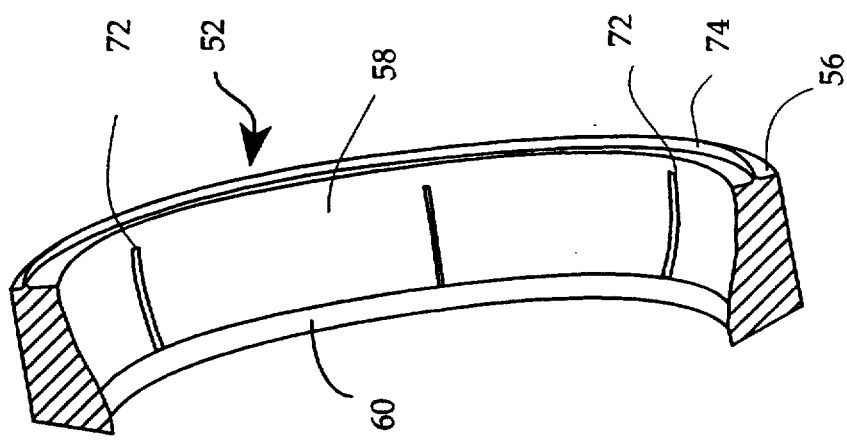
FIG. 4 is a perspective view of the bearing half shown in FIG. 2.

Referring to FIG. 1, a connector assembly of the present invention includes a shaft 12 and a stud end connector 14. A generally spherical ball 16 is positioned at one end of the shaft 12, while the other end of the shaft is threaded. The central portion 18 of the shaft is generally cylindrical, with a downwardly and outwardly sloping portion 22 that terminates in a cylindrical shoulder 24 adjacent to the threaded portion of the shaft 12. A conventional washer 26 and retainer 28 are seated against the shoulder 24. The washer is preferably made of steel, while the retainer is preferably made of Mylar or other similar material.

The ball 16 is not completely spherical in shape, having a distal end that terminates in a flat surface 17. The flat surface lies in a plane which is generally perpendicular to the longitudinal central axis of the shaft 12. The ball 16 is divided into first and second generally hemispherical portions, 19 and 20, respectively, by a horizontal plane that is substantially parallel to the flat surface 17. As is well known in the art, the flat surface 17 is provided with a "TORX" drive recess (not shown), which permits engagement by a tool (not shown) so that turning the tool causes the shaft 12 to be rotated about its central longitudinal axis. This facilitates the threading of the threaded end of the shaft 12 into or out of a cooperating threaded mounting fitting.

The end connector 14 has an enlarged end 30 within which an internal cavity 32 is centrally disposed. The internal cavity 32 includes an upper circular opening 34 and a lower circular opening 36. The upper and lower circular openings 34 and 36 permit access to the internal cavity 32 from without the end 30. The size of the upper opening 34, i.e. its diameter, is selected so that all of the shaft 12, including the ball 16, may readily pass through the opening. The size of the lower opening 36, i.e. its diameter, is selected so that only the threaded end of the shaft 12 and its central portion 18 pass through the opening 36. The ball 16, being too large to pass through the opening 36, is thereby retained within the cavity 32. The differences in the outer dimensions of the ball 16 and the opening 36 provide strong resistance to the ball being pulled out of the cavity through the opening 36. To permit maximum angular rotation of the ball and to minimize interference between the central portion 18 of the shaft 12 during such rotation, the edge of the lower opening 36 is chamfered outwardly as indicated at 38.

The cavity 32 has two main parts or recesses. The first is a generally spherical inner zone surface 40 which is adjacent to the opening 36. The radius of the spherical inner zone surface 40 is selected so that it is substantially equal to that of the spherical outer surface of the ball 16, so that when the ball 16 is disposed in the cavity 32, there will be surface-to-surface contact between the first hemisphere 19 of the ball and the inner zone surface 40. The inner zone surface 40 is defined by a first plane, which is the plane of the opening 36, and a second plane, which is the plane of the circumferential mid-line 42 of the cavity. The first and second planes are parallel to each other and are perpendicular to a central longitudinal axis through the cavity 32. At the mid-line 42, the zone surface 40 terminates in an annular shoulder 44 which extends radially outwardly from the zone surface 40.

The second part of the cavity 32 includes a cylindrical portion 46 immediately adjacent to the shoulder 44. The cylindrical portion has a diameter larger than that of the ball 16 in order to accommodate a bearing half 52 which is disposed in the second part or recess of the cavity 32, as will be described in further detail hereafter. Between the upper end of the cylindrical portion 46 and the opening 34 is a generally circular, continuous annular groove 48 having a smooth peripheral surface. The annular groove 48 is symmetrically disposed about the central longitudinal axis of the cavity 32 and has a diameter that is larger than that of the opening 34 and the cylindrical portion 46.

Figure 3:
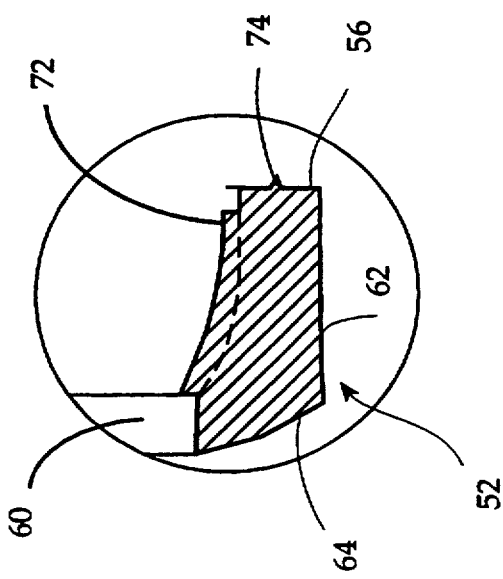
FIG. 3 is a detailed view of the area circled in FIG. 2.
Figure 2:
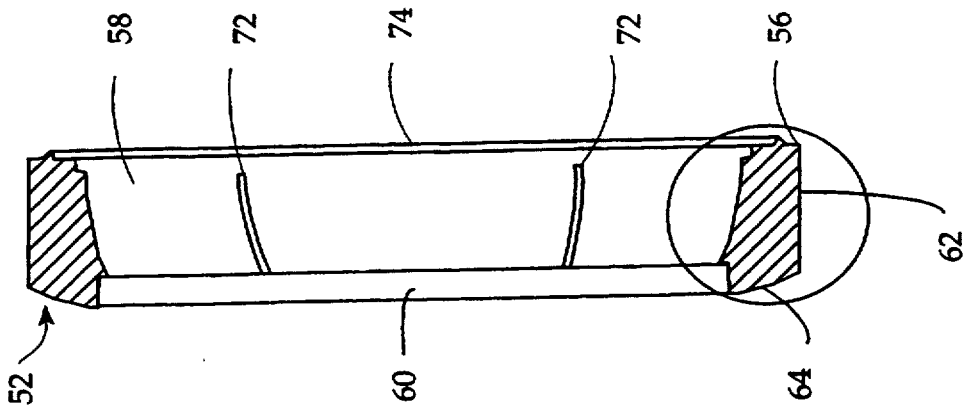
FIG. 2 is a vertical cross-sectional view of the bearing half of the present invention.

Referring to FIGS. 1–4, a bearing half or member 52 has a bottom circumferential planar surface 56 and a lower, generally spherical inner surface 58 which terminates in an upper, generally cylindrical inner surface 60. The bearing half 52 has a generally cylindrical outer surface 62 that has a diameter substantially equal to that of the cylindrical portion 46 of the cavity 32 so that, when the bearing half 52 is inserted into the cavity 32, the outer surface of the bearing half is in surface-to-surface contact with the cylindrical portion 46 of the cavity. An upper surface 64 extends between the inner and outer cylindrical surfaces 60 and 62, respectively, of the bearing half 52, and slopes upwardly from the upper edge of the outer cylindrical surface 62 to the upper edge of the inner cylindrical surface 60. The width of the bottom planar surface 56 of the bearing half, that is, the distance between the inner and outer edges of the bottom surface 56, is selected so that when the outer surface 62 of the bearing half is in contact with the cylindrical portion 46 of the cavity, the inner spherical surface of the bearing half is in alignment with the spherical zone surface 40 of the cavity. Preferably, the bearing half is made of sintered bronze, but other bearing material may be used to manufacture the bearing half.

Since the spherical zone surface 40 of the cavity 32, the spherical surface of the ball 16, the spherical inner surface 58 of the bearing half 52, the height of the bearing half, and the axial location of the groove 48 are all assigned a tolerance that will vary plus or minus from a mean, it is extremely unlikely that a ball and end connector assembly assembled from randomly selected components will have a zero clearance between the ball and the cavity and bearing half. To solve this tolerance problem, the bearing half of the present invention is provided with two distinct sets of crush elements 72 and 74.

The first set of crush elements 72 is integrally molded or machined on the inner spherical surface 58 of the bearing half. The crush elements 72 are preferably thin metal ribs equidistantly Spaced apart on the inner spherical surface and project radially inwardly from the inner spherical surface 58. The crush elements extend between the upper and lower edges of the spherical inner surface. Although six crush elements 72 are illustrated, other numbers of crush elements may be utilized.

The second crush element 74 is an annular thin metal rib integrally molded or machined on the bottom planar surface 56 of the bearing half 52. The crush element 74 is concentrically positioned between the inner and outer edges of the bottom planar surface 56.

A spring wire split retaining ring 78 is disposed within the cavity 32 above the bearing half 52, and is used to retain the bearing half 52 and thereby retain the ball 16 within the cavity 32. The radius of the spherical inner surface 58 is selected so that it is substantially equal to that of the spherical outer surface of the ball 16, so that when the bearing half 52 and the ball 16 are disposed within the cavity 32, there will be essentially surface to surface contact established between the second hemisphere 20 of the ball and the crush ribs 72 and portions of the inner spherical surface 58 of the bearing half 52.

The retaining ring 78 has rounded inner and outer circumferences and is adapted to seat within the groove 48 in the cavity. In this regard, the dimensions of the retaining ring are selected so that, when the retaining ring is in its retaining position, illustrated in FIG. 1, the dimension of its inner opening is less than that of the upper opening 34, but greater than that of the inner spherical surface 58 of the bearing half 52.

The end connector 14 is assembled by inserting the threaded portion of the shaft 18, without the washer 26 and the retainer 28, through the upper portion 34 of cavity 32 until the spherical surface of the ball 16 contacts and is seated on spherical zone surface 40 of the cavity 32. The bearing half 52 is then inserted into cavity 32 until crush element 74 on the bottom planar surface 56 contacts the shoulder 44 in the cavity. The wire ring 78 is inserted into the cavity 32 and sits atop the upper surface 64 of the bearing half 52.

A cylindrical mandrel (not shown) having an end surface, which is configured to match and cooperate with that of the tapered, upper surface 64 of the bearing half 52, is placed in contact with the surface 64 of the bearing half. This mandrel is used to apply an axial (vis-a-vis the end connector 14, downward as seen in FIG. 1) force to the bearing half 52 and a slight radial and axial (downward) force to the ring 78 until the ring 78 moves into a seated retaining position within the groove 48 and the ring 78 bears against surface 64 of the bearing half 52. At the same time, the axial and radial forces cause the crush element 74 to crush against the shoulder 44 in the cavity 32, and the spherical surface of the ball 16 to crush against the crush elements 72 on the inner spherical surface 58 of the bearing half 52. The crushing action of the crush elements 72 and 74 against the spherical surface of the ball 16 and the shoulder 44, respectively, provides for a strong zero clearance assembly of the ball 16 within the cavity 32 without having to machine a groove of complex configuration within the cavity. The strong zero clearance eliminates any rattle or other noise that might occur in a loose assembly. When the retaining ring 78 is seated in the groove 48, it bears against the upper surface 64 of the bearing ring 52, thus preventing the bearing half and, consequently, the ball 16 from being pulled out of the cavity 32.

Typical and representative dimensions of the captive ball and end connector assembly are as follows: the diameter of the upper opening 34 is 0.553 inches, the diameter of the outer periphery of the groove 48 is 0.610 inches; the diameter of the spherical inner surface 58 of the bearing half is 0.480 inches; the height of the crush elements 72, that is, the distance they project from and above the spherical inner surface 58 is 0.008 inches; and the height of the crush element 74, i.e. the distance it projects from the bottom planar surface 56 is 0.008 inches.

As it will be apparent to those skilled in the art, modifications can be made to the above described preferred embodiment and still be within the scope of the present invention. Thus, it is to be understood that the appended claims, and not the foregoing description of the preferred embodiment, particularly point out and distinctly describe what the inventor regards as his invention.

What is claimed is:

1. A captive ball and end connector assembly comprising:

a shaft having a first end and a longitudinal axis; a ball on the first end of the shaft, the ball having an outer, substantially spherical surface with a first hemispherical portion and a second hemispherical portion;

an end connector having a ball receiving cavity and a first opening in communication with the cavity, the first opening having a diameter larger than that of the ball so that the ball may be inserted into the cavity, the cavity including an annular groove disposed adjacent the first opening, and a spherical zone surface formed to correspond to the first hemispherical portion of the ball;

an annular bearing half disposed in the cavity and having a circumferential planar surface at one end thereof and an inner spherical surface formed to correspond to the second hemispherical portion of the ball, the planar surface having a first crush element projecting axially therefrom, and the inner spherical surface having a second crush element projecting radially inwardly therefrom, the bearing half positioned within the cavity so that the first crush element bears against the annular shoulder and the second crush element bears against the second hemispherical portion of the ball to retain the ball within the cavity with a zero clearance therebetween; and and ball retaining ring disposed within the cavity groove and bearing against the bearing half to prevent the ball from being pushed out of the cavity.

2. The captive ball and end connector assembly of claim 1, wherein the first crush element is an annular rib integrally formed on the planar surface.

3. The captive ball and end connector assembly of claim 2, wherein the annular rib is concentrically positioned on the planar surface.

4. The captive ball and end connector assembly of claim 2, wherein the second crush element includes a plurality of ribs integrally formed on the inner spherical surface.

5. The captive ball and end connector assembly of claim 4, wherein the annular rib is concentrically positioned on the planar surface.

6. The captive ball and end connector assembly of claim 5, wherein the end connector includes a second opening in communication with the cavity, the second opening having a diameter smaller than the ball but larger than the shaft, so that the shaft extends out of the second opening when the ball is inserted into the cavity through the first opening.

7. The captive ball and end connector assembly of claim 6, wherein the spherical zone surface is adjacent the second opening.

8. The captive ball and end connector assembly of claim 7 wherein the cavity has a central longitudinal axis; wherein the spherical zone surface of the cavity terminates in an annular shoulder that is recessed from the spherical zone surface; and wherein the annular shoulder lies in a plane that is perpendicular to the central longitudinal axis.

9. The captive ball and end connector assembly of claim 8, wherein the cavity has a cylindrical portion disposed between the annular groove and the spherical zone surface; and wherein the bearing half has a cylindrical outer surface that is in surface-to-surface contact with the cylindrical portion of the cavity when the bearing half is disposed in the cavity.

10. The captive ball and end connector assembly of claim 4, wherein the plurality of ribs are equidistantly spaced apart on the inner spherical surface.

11. The captive ball and end connector assembly of claim 1, wherein the second crush element includes a plurality of ribs integrally formed on the inner spherical surface.

12. The captive ball and end connector assembly of claim 11, wherein the plurality of ribs are equidistantly spaced apart on the inner spherical surface.

13. The captive ball and end connector assembly of claim 1 wherein the annular bearing half has a radially inwardly sloped surface at its other end thereof.

14. The captive ball and end connector assembly of claim 13 wherein the ball retaining ring bears against the planar surface of the bearing half.

15. The captive ball and end connector assembly of claim 1 wherein the cavity has a central longitudinal axis; wherein the spherical zone surface of the cavity terminates in an annular shoulder that is recessed from the spherical zone surface; and wherein the annular shoulder lies in a plane that is perpendicular to the central longitudinal axis.

16. The captive ball and end connector assembly of claim 1, wherein the end connector includes a second opening in communication with the cavity, the second opening having a diameter smaller than the ball but larger than the shaft, so that the shaft extends out of the second opening when the ball is inserted into the cavity through the first opening.

17. The captive ball and end connector assembly of claim 16, wherein the spherical zone surface is adjacent the second opening.

18. The captive ball and end connector assembly of claim 1, wherein the cavity has a cylindrical portion disposed between the annular groove and the spherical zone surface.

19. The captive ball and end connector assembly of claim 18, wherein the bearing half has a cylindrical outer surface that is in surface-to-surface contact with the cylindrical portion of the cavity when the bearing half is disposed in the cavity.

* * * * *